(12) United States Patent  (10) Patent No.: US 8,170,959 B2
Willoughby et al.  (45) Date of Patent: May 1, 2012

(54) SYSTEMS AND METHODS FOR A LABEL WITH POSTAGE API

(75) Inventors: Stuart Willoughby, Oakton, VA (US); Ronald F. Smith, Rockville, MD (US); Daniel Lord, Upper Marlboro, MD (US); Charles Outman, Damascus, MD (US); Joseph A. Otten, San Francisco, CA (US); John Gullo, Alexandria, VA (US); Anna Vale, Pearland, TX (US)

(73) Assignee: United States Postal Service, Washington, DC (US)

( * ) Notice: Subject to any disclaimer, the term of this patent is extended or adjusted under 35 U.S.C. 154(b) by 1733 days.

(21) Appl. No.: 10/144,870

(22) Filed: May 15, 2002

(65) Prior Publication Data

US 2003/0217017 A1  Nov. 20, 2003

Related U.S. Application Data

(63) Continuation of application No. PCT/US2002/018552, filed on May 13, 2002.

(60) Provisional application No. 60/290,048, filed on May 11, 2001.

(51) Int. Cl.
*G06F 17/00* (2006.01)
*G06Q 10/00* (2006.01)
*G06Q 30/00* (2006.01)

(52) U.S. Cl. .................. 705/404; 705/1.1; 705/26.1

(58) Field of Classification Search .................. 705/401, 705/1.1, 26, 404

See application file for complete search history.

(56) References Cited

U.S. PATENT DOCUMENTS

| | | | |
|---|---|---|---|
| 4,832,204 A | 5/1989 | Handy et al. | |
| 5,065,000 A | 11/1991 | Pusic | |
| 5,117,364 A * | 5/1992 | Barns-Slavin et al. | 705/402 |
| 5,822,738 A * | 10/1998 | Shah et al. | 705/410 |
| 6,047,273 A * | 4/2000 | Vaghi | 705/410 |
| 6,175,825 B1 * | 1/2001 | Fruechtel | 705/404 |
| 6,233,565 B1 * | 5/2001 | Lewis et al. | 705/35 |
| 6,244,763 B1 * | 6/2001 | Miller | 400/76 |
| 6,426,471 B1 | 7/2002 | Gubitose | |
| 6,438,530 B1 * | 8/2002 | Heiden et al. | 705/401 |
| 6,461,063 B1 * | 10/2002 | Miller et al. | 400/76 |
| 6,470,327 B1 * | 10/2002 | Carroll et al. | 705/401 |
| 6,671,813 B2 * | 12/2003 | Ananda | 726/3 |
| 6,865,560 B1 * | 3/2005 | Sansone et al. | 705/404 |
| 6,939,063 B2 * | 9/2005 | Bussell | 400/103 |
| 6,982,808 B1 * | 1/2006 | Ogg et al. | 358/1.18 |
| 7,222,236 B1 * | 5/2007 | Pagel | 713/176 |
| 7,251,632 B1 * | 7/2007 | Ogg et al. | 705/62 |
| 7,421,403 B2 * | 9/2008 | Jacoby, Jr. | 705/37 |
| 2002/0040353 A1 * | 4/2002 | Brown et al. | 705/401 |
| 2002/0073039 A1 * | 6/2002 | Ogg et al. | 705/60 |
| 2002/0104026 A1 * | 8/2002 | Barra et al. | 713/202 |
| 2002/0167162 A1 * | 11/2002 | Petkovsek | 283/81 |
| 2003/0078893 A1 * | 4/2003 | Shah et al. | 705/60 |

\* cited by examiner

*Primary Examiner* — Fadey S Jabr

(74) *Attorney, Agent, or Firm* — Lewis & Roca LLP

(57) ABSTRACT

A label and a method for providing a label to a user is described. The label may be a mailing label to be placed on letters or parcels. The label includes information such as postage, delivery address, return address, and a barcode for tracking delivery information. A user may request both a label and postage in what, to the user, appears to be a single computerized connection on a single internet web-page. A postage indicia is provided through a postage provider with whom the user has a deposit or credit. The label itself may be generated through a label-generating application hosted or generated by an entity separate from the postage provider.

7 Claims, 5 Drawing Sheets

Label w/Postage API
Solution Architecture

Figure 4

SYSTEMS AND METHODS FOR A LABEL WITH POSTAGE API

STATEMENT REGARDING FEDERALLY SPONSORED RESEARCH OR DEVELOPMENT

The invention was made by an agency of the United States government or under a contract with an agency of the United States government, the United States Postal Service ("USPS"), an independent establishment of the executive branch of the U.S. government.

CROSS-REFERENCE TO RELATED APPLICATIONS

This application is a continuation of International Application PCT/US2002/018552 titled "SYSTEMS AND METHODS FOR A LABEL WITH POSTAGE APPLICATION PROGRAMMING INTERFACE" to WILLOUGHBY et al. that was filed on May 13, 2002, which claimed priority to U.S. Provisional Application No. 60/290,048 filed on May 11, 2001, to the same.

BACKGROUND OF THE INVENTION

1. Field of the Invention

This invention relates generally to providing a label to a customer or user, the label includes address information, postage indicia and a delivery confirmation barcode. More particularly, it relates to systems and methods for providing software tools to allow a user to make an online request for a label, generate the label in conjunction with a postage vendor, and return the label to the user. The user may then print the label and attach it to a mailpiece. The mailpiece may thereafter be placed into the mailstream, for example the mailstream provided by the USPS for delivery of the mailpiece to the recipient specified on the label.

2. Description of the Related Art

The United States Postal Service currently provides on-line services to Internet users through the USPS Web Tools system. These services enable e-tailers to embed USPS shipping functionality into their e-commerce web sites. These USPS services went into operation in August of 1999. Enhancements are continually being added. The on-line services offered as of December 2001 include track/confirm services, address checking, domestic and international postage rates, and shipping labels, among others.

The current USPS Web Tools system provides Application Program Interfaces (APIs) which allow developers of web-based and shrink-wrapped applications to gain access to these on-line services. In order to take advantage of these services, a software developer may visit the web site http://www.usps.com/shipping, click on the Web Tools link, and then Register for access to the APIs. Some of the resources provided by the USPS Web Tools system are web tool registration, documentation, XML code samples, resource links, and an XML test server. A registered user is assigned and e-mailed a uniquely generated user ID and password, which grants access to the programming documentation and the Web Tools system APIs.

One of the specific services that the USPS currently provides relates to labeling. The USPS allows a user to develop shipping labels with a return address delivery address, and a delivery confirmation barcode electronically via the USPS Shipping API system. The USPS Shipping API system provides software interfaces for accessing USPS shipping information over a network. The shipping information may include, but is not limited to, postal rates, mail tracking information, service standards, and issuance of delivery confirmation barcodes. The network is preferably the internet; however, any type of network known to those skilled in the art may be used. A delivery confirmation barcode includes information about the delivery point of a mailpiece and may be used to track the mailpiece in a mailstream.

In addition to the above-mentioned web tools, the USPS also authorizes postage vendors, such as PC Postage Vendors, to provide an IBIP (Indicia Based Information Program) or postage indicia electronically via the internet. The IBIP may be printed on, for example, an envelope or a label, to indicate postage payment. At present the IBIP is not seamlessly integrated into the other USPS web tools. A user who wishes to obtain postage electronically and who also wishes to access the available USPS electronic services must separately access these functionalities.

Postage cannot be sold on credit. Therefore a PC Postage Provider may offer the user the ability to charge a credit card and place the escrowed funds in a "Pre-Paid Postage Account". Most providers charge a flat monthly fee for providing their services. For promotional purposes, some providers may give a modest amount of 'free' postage when registering with them. When the user buys Indicia, funds are drawn from the Pre-Paid Postage Account, and some providers add a surcharge onto the postage amount. The user adds funds to their Pre-Paid Postage Account by re-charging their credit card. Providers may be permitted to charge a minor percentage for refunded transactions, or a minor fee when an account is closed.

Users can perform additional functions, such as obtain the balance of their Pre-Paid Postage Account, obtain a transaction history, update their registration information, and/or close their Postage Provider account. Most of these transactions either involve the perusal of financial data or the direct movement of funds.

In general, the USPS Web Tools system should duplicate the overall utility of each of these financial transactions in order to accommodate the needs and expectations of both the consumer of the services and the Provider of the services. With that in mind, a number of modular components, APIs may be built onto the front-end of the Web Tools system to produce a Shipping Label With PC Postage, and to support its production.

The new Shipping Label With PC Postage service introduces several key differences over the other free USPS Web Tool services currently being offered: It involves numerous participating PC Postage Providers on the back-end (while providing the consumer a common interface on the front-end), involves a deliberate selection of a PC Postage Provider by the consumer, involves the transfer of financial information between a consumer of the service and their selected PC Postage Provider, and addresses additional security concerns to protect sensitive data. By constructing the USPS Web Tools system to be the common middleware for the consumer of this new service, the consumer is shielded from the complexities and nuances of dealing with the business processes, security arrangements, and software configurations of the various PC Postage Providers.

Besides simplifying the USPS Web Tools interfaces so that the consumer need not be concerned about the complex effort to communicate with each PC Postage Provider in order to print a Shipping Label With PC Postage, there are other benefits to the consumer of the Web Tools services: By having multiple PC Postage Providers participate, the consumer need not be concerned about the possible impact to their business if their chosen Postage Provider should suffer extensive system downtime, experience a disaster, or decide to exit from the IBI business, since the consumer can easily select another Provider. The USPS Internet Customer Care Center will provide a single point of contact for customer support.

This design also enables the Postal Service to deliver an expanding set of easy to use on-line services through a familiar interface. Besides the benefits for the consumers, there are also many expected benefits of this new Shipping Label With PC Postage service for those PC Postage Providers who choose to be included in the back-end fulfillment of this service. Hopefully they will realize: reduced customer acquisition costs (since this service will generate new customer accounts electronically), reduced customer support costs, increased revenue (since the volume of generated Indicia will increase, and the dollar value for package Indicia far exceeds that of a first-class letter), and increased reach and market expansion.

It is accordingly desirable to allow a user to make a request for a label that includes address information, a postage indicia, and a delivery confirmation barcode, generate the requested label, debit a prepaid postage account for the cost of the label, and send the label to the user. This is achieved by providing systems and methods for a label with postage application programming interface ("API"), which provides software interfaces to intermediaries and postage vendors to facilitate the generation and distribution of labels that include address information, postage indicia, and delivery confirmation barcodes.

SUMMARY OF THE INVENTION

In accordance with the invention, a method for providing a label to a user, wherein the label includes address information, a postage indicia, and a delivery confirmation barcode, and wherein the request includes label information. Such method comprises receiving from a user a request for a label; determines a postage rate and sends the request and postage rate to a postage vendor; the postage vendor debits a prepaid account for the postage rate and any additional associated label fee and returns a postage indicia; requests and receives a delivery confirmation barcode; generates the label based on the postage indicia, label information, and delivery confirmation barcode; records the transaction; and sends the generated label to the user.

A further object of the invention is to provide a method whereby a certified intermediary acts as an intermediary between a user and the USPS shipping system. In this method a user could interact with a certified intermediary for both labeling and postage services. A certified intermediary may be a third party who registers with the USPS and receives authorization to access USPS APIs including Shipping Assistant. The certified intermediary can thereupon create its own webpage or other computer system which a user may access. It is envisioned that such a web page or single access system would be provided by those groups or entities which are responsible for mailings, as for example, a company shipping department or a community shipping office.

Still a further object of the invention is to provide a simplified method whereby a user may obtain both a labeling functionality and postage indicia. Providing a method that, to the user, seamlessly offers both labeling options and postage indicia is advantageous.

An additional object of the invention is to allow a user the freedom to select a preferred PC Postage Provider. In this way the user may select postage through a provider with whom the user has an account. If, for example, that provider experiences difficulties, the user may change the postage provider selection. Thus the system will include access to those PC Postage Providers qualified to offer postage indicia.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed. Thus, the present invention comprises a combination of features and advantages which enable it to overcome various deficiencies of the prior art. The various characteristics described above, as well as other features, will be readily apparent to those skilled in the art upon reading the following detailed description of the preferred embodiments of the invention, and by referring to the accompanying drawings. The accompanying drawings, which are incorporated in and constitute a part of this specification, illustrate embodiments of the invention and, together with the description, serve to explain the principles of the invention.

BRIEF DESCRIPTION OF THE DRAWINGS

For a detailed description of a preferred embodiment of the present invention, reference will now be made to the accompanying drawings, which form a part of the specification, and wherein:

FIG. 4 is a flowchart that shows the steps for registering a certified intermediary through a USPS API Registration web site.

DETAILED DESCRIPTION OF THE PREFERRED EMBODIMENT

Reference will now be made in detail to exemplary embodiments of the invention, examples of which are illustrated in the accompanying drawings. Wherever possible, the same reference numbers will be used throughout the drawings to refer to the same or like parts.

Figure 1:
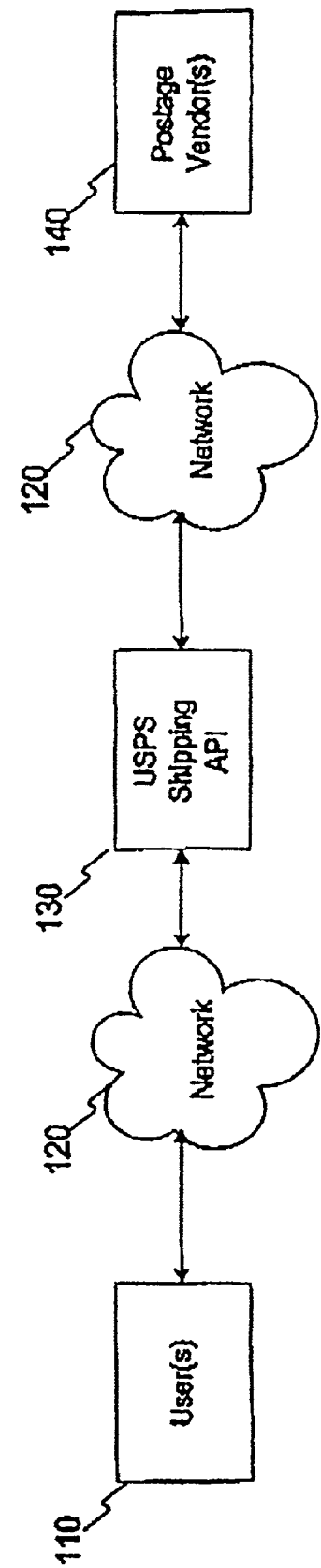
FIG. 1 is a flowchart that shows the steps for generating and distributing a label to a user through a shipping system, and a PC Postage vendor providing information relevant to the label.

In one embodiment, the shipping system is the USPS Shipping API system, which may be implemented in any programming language, for example, C++, Visual Basic, Java, etc. The label with postage API provides software interfaces to postage vendors, for example an authorized PC Postage vendor, for communicating with the USPS Shipping API system. FIG. 1 shows one embodiment of a label with postage API system, which may be implemented in any combination of software and hardware components in accordance with the principles of the present invention.

As shown in FIG. 1, a user 110 makes a request through a network 120 to a shipping system 130 for a label that includes address information, a postage indicia, and a delivery confirmation barcode. The request includes label information, for example, the name of the sender and/or a return address, the name and/or address of the recipient, and a mailing type for the label, such as Parcel Post, Express Mall, or Priority Mail. Optionally, the request may include the user's selection of a postage vendor 140, for example, VendorA, VendorB, or VendorC. The network 120 may include a Local Area Network (LAN), a Wide Area Network (WAN), a wireless network, the internet, and/or any other communication medium.

The shipping system 130 receives the request for the label and determines a postage rate. The shipping system 130 may include, for example, the USPS Shipping API system. Thereafter, the shipping system 130 sends the request and postage rate through the network 120 to a postage vendor 140 specified in the request. If no postage vendor 140 is specified in the request, the shipping system 130 selects a default postage vendor 140 and send the request and postage rate to the shipping system 130 and the postage vendor 140 are in the form of XML. However, other forms of communication may be used, such as HTML.

The postage vendor 140 debits a prepaid account for the postage rate and any additional associated label fee, and returns a postage indicia through the network 120 to the shipping system 130. The shipping system 130 requests and receives a delivery confirmation barcode from the USPS. Thereafter, the shipping system 130 generates the label based on the postage indicia, label information, and delivery confirmation barcode. The shipping system 130 may record the transaction. Finally, the shipping system 130 sends the generated label through the network 120 to the user 110.

In another embodiment, the shipping system is the USPS Shipping API system. A certified intermediary is an intermediary between the user and the shipping system. The certified intermediary may be a third party intermediary who is registered with the USPS and authorized to access the USPS Shipping API. The label with postage API provides software interfaces to third parties, such as the certified intermediaries, for communicating with the USPS Shipping API system. Alternatively, the certified intermediary may be a USPS Shipping Assistant. The USPS Shipping Assistant is a software application that provides software user interfaces, for example, a graphical user Interface, to provide shipping information to users. The shipping information may include, postal rates, mail tracking, service standards, issuance of delivery confirmation barcodes, information for tracking mailpieces, etc. The USPS Shipping Assistant is designed for users who want to use the USPS Shipping APIs but do not have the time or programming expertise and resources to integrate the USPS shipping API software interfaces into their systems or web sites.

Figure 2:
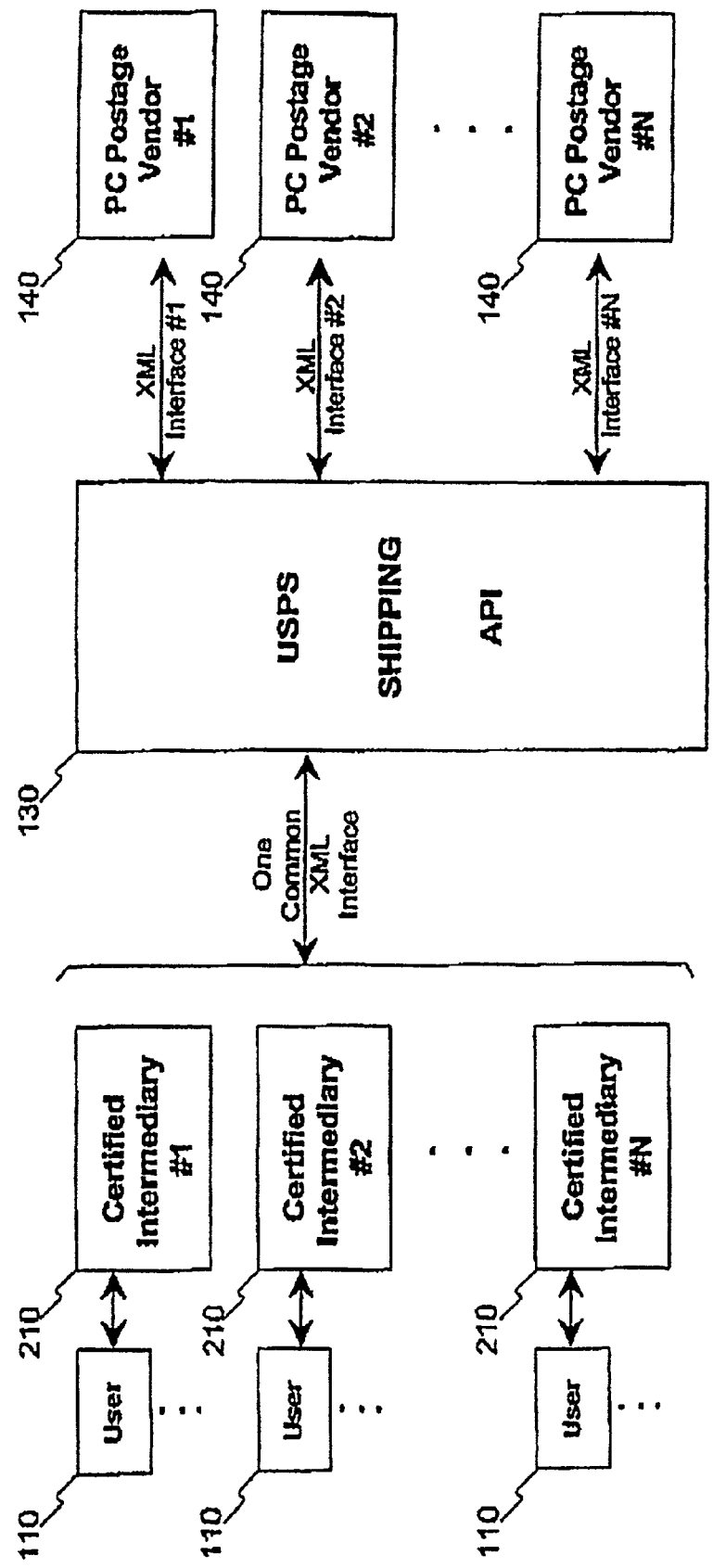
FIG. 2 is a flowchart that shows the steps for generating and distributing a label to a user through a certified intermediary accessing a shipping system, and a PC Postage vendor providing information relevant to the label.

FIG. 2 shows one embodiment of a label with postage API system, which may be implemented in any combination of software and hardware components in accordance with the principles of the present invention. As shown in FIG. 2, a user 110 makes a request to a certified intermediary 210 for a label that includes postage and a delivery confirmation barcode. The request includes label information, for example, the name and address of the sender, the name and address of the recipient, and a mailing type for the label, such as Parcel Post, Express Mail, or Priority Mail. Optionally, the request may include the user's selection of a PC Postage vendor 140, for example, VendorA or VendorB. In a preferred embodiment, the PC postage vendors are postage vendors who have been authorized by the USPS to issue electronic postage. The certified intermediary 210 then sends the request to a shipping system 130, for example, the USPS Shipping API system. In a preferred embodiment, the certified Intermediary 210 and the shipping system 130 exchange Extensible Markup Language (XML) messages via a direct Transmission Control Protocol/Internet Protocol (TCP/IP) socket. However, the certified Intermediary 210 and the shipping system 130 may exchange HyperText Markup Language (HTML) messages using a HyperText Transfer Protocol (HTTP) or, in a wireless environment, may exchange Wireless Markup Language (WML) messages using a Wireless Application Protocol (WAP).

The shipping system 130 receives the request for the label and determines a postage rate. Thereafter, the shipping system 130 sends the request and postage rate to the PC Postage vendor 140 specified in the request. If no PC postage vendor 140 is specified in the request, the shipping system 130 selects a default PC Postage vendor 140 and sends the request and postage rate to the default PC Postage vendor 140. In a preferred embodiment, the shipping system 130 and the PC Postage vendor 140 exchange XML messages via a direct TCP/IP socket. However, the shipping system 130 and the PC Postage vendor 140 may exchange HTML messages using HTTP or, in a wireless environment may exchange WML messages using a WAP.

The PC Postage vendor 140 debits a prepaid account for the postage rate and any additional associated label fee, and returns a postage indicia to the shipping System 130. The shipping system 130 requests and receives a delivery confirmation barcode from the USPS. Thereafter, the shipping system 130 generates the label based on the postage indicia, label information, and delivery confirmation barcode. The shipping system 130 may record the transaction. Finally, the shipping system 130 sends the generated label to the certified intermediary 210 for distribution to the user 110.

The system and method that have been described may be comprised of a variety of hardware and software packages. From the standpoint of the user, the particular hardware or software package required may depend on the requirements necessary to interact with the certified intermediary. Where, for example, the certified intermediary is a company shipping department, the connection between the user and certified intermediary may be through an intranet system or other network. However, the system is also designed such that connections over the internet may also provide the needed connection. The shipping label with postage system will operate on commonly-used operating system such as Microsoft Windows and LINUX.

Figure 3:
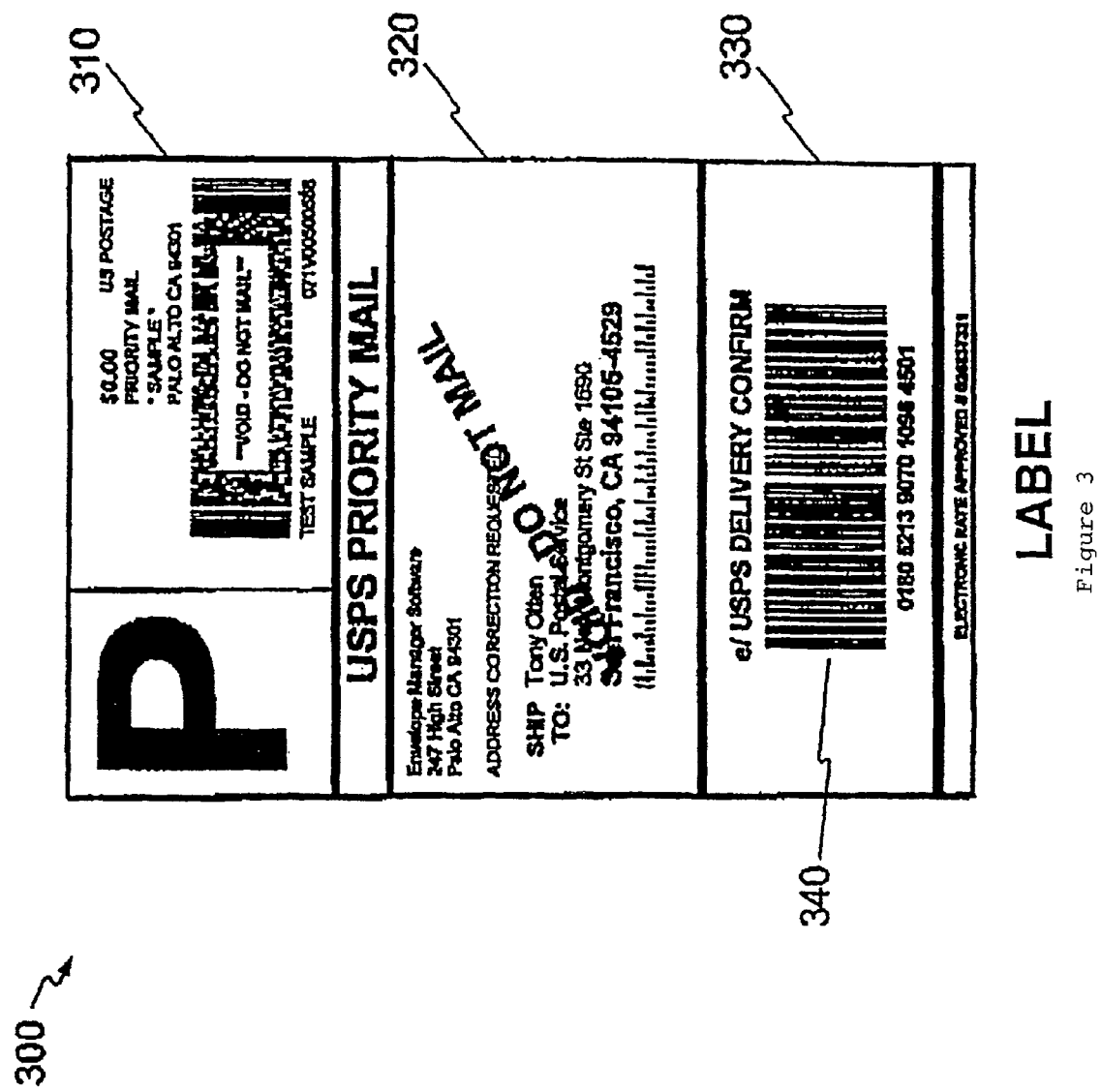
FIG. 3 is a drawing that shows the contents of a label.

One example of the label is shown in FIG. 3, wherein the top portion represents the postage indicia 310, the middle portion represents the label information 320, and the bottom portion represents the delivery confirmation information section 330 that includes the delivery confirmation barcode 340. It should be understood that other information may be included in the label.

Figure 4:
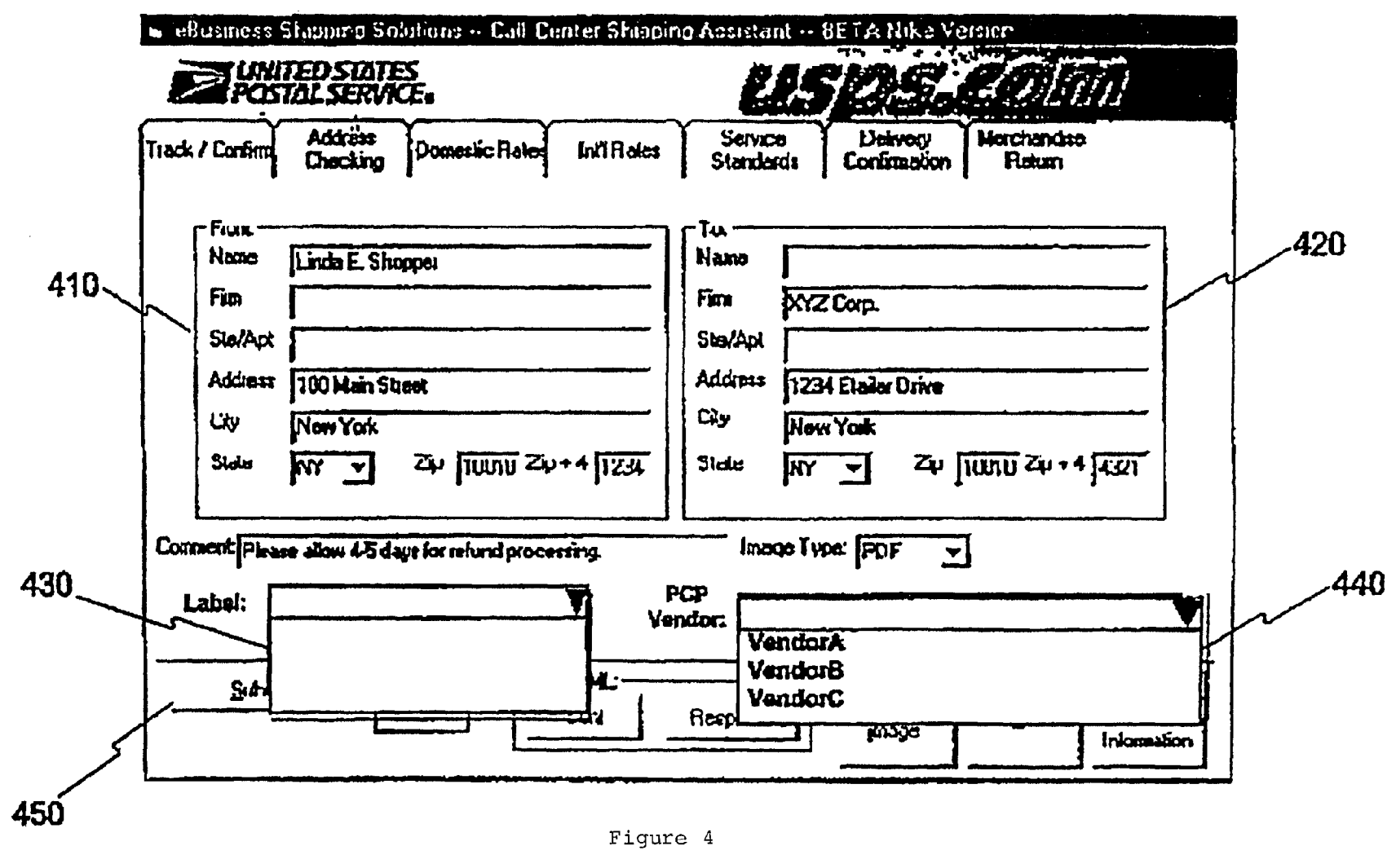

FIG. 4 depicts one example of a graphical user interface form that is used by the USPS Shipping Assistant to allow a user 110 to enter information relevant to a label and to submit a request for the label to the USPS Shipping API system. As shown in FIG. 4, the user enters information about the sender into the "From" section 410. The user enters information about the recipient into the "To" section 420. The user may select a mailing type for the label from a pulldown list 430, which includes, for example, Parcel Post, Express Mail, and Priority Mail. Further, the user may select from a PCP Vendor pulldown list 440 an authorized PC Postage vendor to use in the label generation transaction, for example, VendorA, VendorB, or VendorC. Once the user completes filling out the form, the user clicks a "Submit" button 450 to send the request to a certified intermediary 210.

Figure 5:
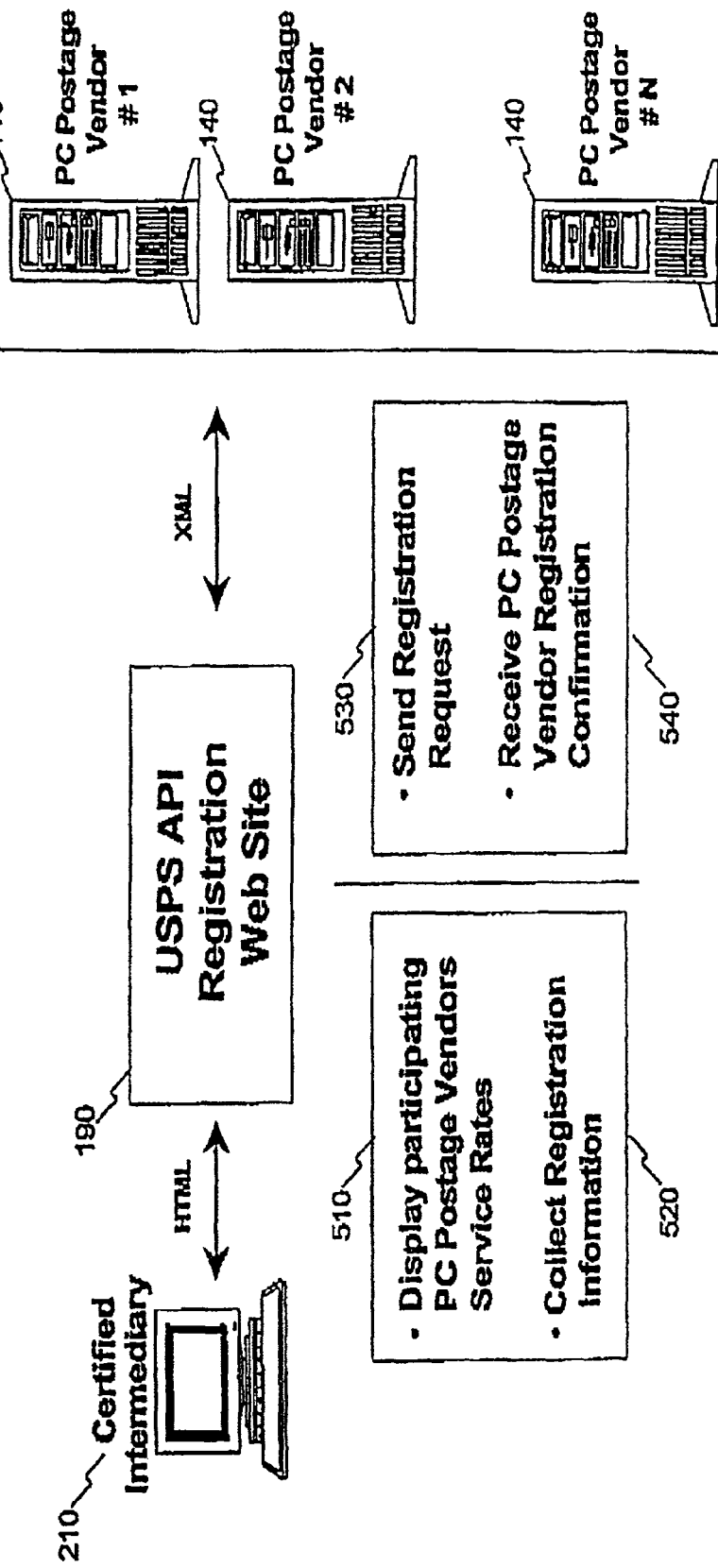
FIG. 5 is a drawing that shows a system for registering certified intermediaries.

FIG. 5 provides one embodiment of a registration system for registering certified intermediaries 210. As shown in FIG.

5, a certified intermediary 210 accesses a registration provider 190 through a network to submit a certification request. The registration provider 190 may include, for example, a USPS API Registration web site. In a preferred embodiment, the certified intermediary 210 and the registration provider 190 exchange HTML messages via HTTP. However, the certified intermediary 210 and the shipping system 130 may exchange XML messages via a direct TCP/IP socket or, in a wireless environment, may exchange WML messages using WAP.

The registration provider 190 sends an HTML page containing a list of participating PC Postage vendors 140 service rates The list of participating PC Postage vendors 140 service rates is displayed in a web page to the certified intermediary 210 through a web browser (step 510). The certified intermediary 210 selects one or more PC Postage vendors 140 and provides other registration information, for example, information about the certified intermediary, information for establishing a prepaid postage account, etc. The certified intermediary also agrees to adhere to the terms and conditions for certified intermediaries. When the certified intermediary 210 completes providing the registration information, the certified intermediary 210 selects the submit button on a form displayed in a web page and the registration information is sent to the registration provider 190 in the format of HTML.

The registration provider 190 receives the registration information (step 520). The registration provider 190 generates a registration request based on the registration information and sends the registration request to each of the PC Postage vendors 140 selected by the certified intermediary 210 (step 530). In a preferred embodiment, the registration provider 190 and each of the PC Postage vendors 140 exchange XML messages via a direct TCP/IP socket. However, the registration provider 190 and one or more of the PC Postage vendors 140 may exchange HTML messages using HTTP or, in a wireless environment, may exchange WML messages using WAP.

Each of the selected PC Postage vendors 140 receives the registration request and may create and/or maintain the certified Intermediary's 210 prepaid postage account. In addition, each of the selected PC Postage vendors 140 sends a registration confirmation to the registration provider 190. Thereafter, the registration provider 190 receives the registration confirmation(s) (step 540). Finally, the registration provider 190 makes available to the certified intermediary 210 the software interfaces provided by the label with postage API.

In the system disclosed, a registered user id and password may be required to by authenticate each XML request received by the front-end of the USPS Web Tools system. Also mentioned earlier, the XML data transmitted over the Internet to the front-end of the Web Tools system may use SSL3 encryption with the HTTPS protocol.

Secure Sockets Layer encryption has been used for many years by e-commerce web sites on the Internet, encoding communications without the user ever even needing to know, let alone activate anything. This is a very standard and common technique for securing sensitive data (such as credit card numbers) sent over the Internet. Special SSL accelerator hardware may be added to the Web Tools servers to minimize any front-end API performance degradation.

In one embodiment of this Shipping Label With PC Postage concept, the Web Tools system also may also securely communicate the XML data to the USPS approved PC Postage Providers. Such secured transmissions may be used to send a request, on behalf of a Certified Intermediary, to the specified Postage Provider, to obtain an Indicia, to receive the response, with the Indicia serial number and graphic, generate the appropriate Shipping Label, and return the Shipping Label With PC Postage to the calling user for a successful printout.

Communication security on the back-end of the USPS Web Tools system can be accomplished through at least four security techniques. In general, these techniques may be employed individually or in combination with each other. For PC Postage Providers that require a particular digital signature encryption algorithm, it may be included in the communication interface between the Web Tools system and that provider.

The first security technique consists of authenticating the Postage Provider user at the application software level. It is envisioned that this technique will be used, without regard to the other techniques. Each XML request on the back-end will contain the user's Postage Provider Account ID and PassPhrase, which will identify the user to the Postage Provider system. It should be noted that the account ID and PassPhrase are items that the user establishes when opening an account with the individual PC Postage Provider. This data originates in the call to the front-end of the Web Tools system by the registered user, and is then passed-through to the chosen Postage Provider system on the back-end. The PassPhrase is never stored on the Web Tools system. Likewise, methods of payment (such as credit card numbers) are passed-through the Web Tools system and are not stored.

A second technique that may be exercised is to use a software routine that directly encrypts the XML data before it is transmitted between the Web Tools system and a given Postage Provider system. The Postage Provider would supply the propriety software encryption algorithm that would be incorporated into the back-end interface of the Web Tools system.

A third technique that could be utilized to secure the data transmission is to use SSL3 encryption with the HTTPS protocol. Secure Sockets Layer encryption is a proven technique for securing sensitive data sent over the Internet.

A fourth technique for securing the back-end communication interface is the implementation of VPN hardware "blackboxes". This approach is simple to implement since it protects the data at the network level by means of a hardware firewall appliance that creates a Virtual Private Network using the Triple Data Encryption Standard (3DES). The VPN enables IP traffic to possess and secure connectivity over a public TCP/IP network by encrypting all traffic from one network to another. The VPN uses tunneling to encrypt all data at the IP level.

Because of the potential variety of PC Postage Provider hardware, operating system software, and application software configurations that could exist, it is recommend that the VPN and 168-bit 3DES encryption be performed with a hardware device (similar to a Cisco Secure PIX 500 Firewall or AXENT Technologies VelociRaptor Firewall Appliance) rather than in software.

A pair of these hardware devices may be used; one connected to the USPS Web Tools system and the other at the physical location of the Postage Provider. Both devices are similarly configured and keyed prior to delivering one to the Postage Provider, such that installation could be as simple as plugging it in to the network. If the device is opened, the key gets erased. Physical possession of the black box is crucial, as it will only communicate with its similarly keyed counterpart. Therefore, this technique also relies on stringent physical security. Security policy rules will be entered into the devices to regulate allowable session duration, byte counts, authentication methods, URLs, user names, etc. These devices also incorporate logging and reporting functions to alert potential security threats. Attempts to gain access to a networked device by posing as an authorized user, device, or program (i.e. spoofing) would be logged.

In operation the shipping label with postage system functions as follows. A user may have previously selected a PC Postage Vendor from whom the user purchases electronic postage. Based on the requirements of this postage provider, the user will have deposited funds with the postage provider or provided a means of credit, such as a credit card. In this manner the user will have funds with which to purchase postage. The user will next access the web page of a certified intermediary. The user may do this by accessing the internet web page that the selected certified intermediary has created to assist with labeling. It may be the case that the certified intermediary is the shipping department of a business or group with whom the member is employed or affiliated. The web page allows the user to input information related to the label For example, the user will input the addressee information and the return address information. The user will input the type of mail delivery requested such as regular mail or Express Mail. In order to properly calculate the postage required, the user may have to input other information such as the weight and dimensions of the item to be posted. The user may also request that a bar code be issued with the label. The particular system provided by the intermediary may, in conjunction with other applications provided by the Postal Service, allow for a graphical design of the label. Finally, the user will submit the access code and pass word associated with the PC Postage Vendor.

When the user has completed this information, he takes the action appropriate to submit this label and postage request. In doing so, the certified intermediary computer transmits the user's request to the Postal Service Shipping Assistant system. With respect to the postage request, the shipping system calculates the amount of postage required based on the information submitted by the user. The shipping system then identifies a postage provider to whom to transmit the postage request. If the user has selected a postage provider, the shipping system transmits the postage request to this entity. If no postage provider was selected, the shipping system selects one, as for example, by a random selection, a geographic match, or some other specified criteria.

The PC Postage Provider processes the postage request. In the first instance, it confirms that the account id and password are valid. It checks, for example, that finds are available. Finally, it processes the postage request and issues the postage indicia. The postage provider will also debit the funds of the user corresponding to the postage that was purchased. This postage indicia is returned to the shipping system.

The shipping system also processes the labeling information received from the user. In this manner the shipping system generates a label with the required address information. Upon receipt of the postage indicia from the postage provider, the shipping system generates the label with address, bar code, and postage indicia. The bar code stores the data associated with the label request. The label is electronically transmitted to the certified intermediary.

The user, still accessing the certified intermediary, receives the label. Thereupon he can print the label in the preferred manner, for example, as a label or on an envelope. The item to be mailed may then be deposited with the postal service.

That completes the steps of creating the label. It should be added that the information associated with the mailed item may be updated via the bar code as the item passes through the post. For example, if the user had requested a trace or confirmation of delivery, the bar code that is on the label will provide the means to track the delivery process.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. A computer-implemented method comprising:
  registering an intermediary with a postage vendor;
  authorizing the intermediary to access shipping APIs from a computer implemented shipping API system;
  providing shipping information on a user interface to a user through the intermediary;
  receiving by the intermediary a request from the user for a shipping label through the user interface;
  delivering the request from the intermediary to the computer-implemented shipping API system through the shipping APIs;
  determining by the computer-implemented shipping API system a postage rate for the shipping label;
  delivering the request and the postage rate from the computer-implemented shipping API system to the postage vendor;
  debiting by the postage vendor of a prepaid account having funds supplied by the user in at least the amount of the postage rate;
  delivering postage indicia from the postage vendor to the computer-implemented shipping API system;
  generating by the computer-implemented shipping API system the shipping label; and
  delivering the shipping label from the computer-implemented shipping API system to the intermediary and from the intermediary to the user;
  wherein the intermediary, user, computer-implemented shipping API system, and postage vendor are each one of independent parties and interfaces relative to one another.

2. The method of claim 1 wherein the intermediary is registered with an operator of the computer implemented shipping API system.

3. The method of claim 2 further comprising selecting by the computer implemented shipping API system the postage vendor.

4. The method of claim 1 wherein the request includes a name and address of the user, a name and address of a recipient, and a mailing type.

5. The method of claim 1 further comprising selecting by the user the postage vendor.

6. The method of claim 1 wherein the label includes a name and address of the user, a name and address of a recipient, a mailing type, the postage rate, and a delivery confirmation barcode.

7. The method of claim 1 wherein the shipping information comprises postal rates, mail tracking, service standards, issuance of delivery confirmation barcodes, and information for tracking mailpieces.

* * * * *